Patented Mar. 2, 1943

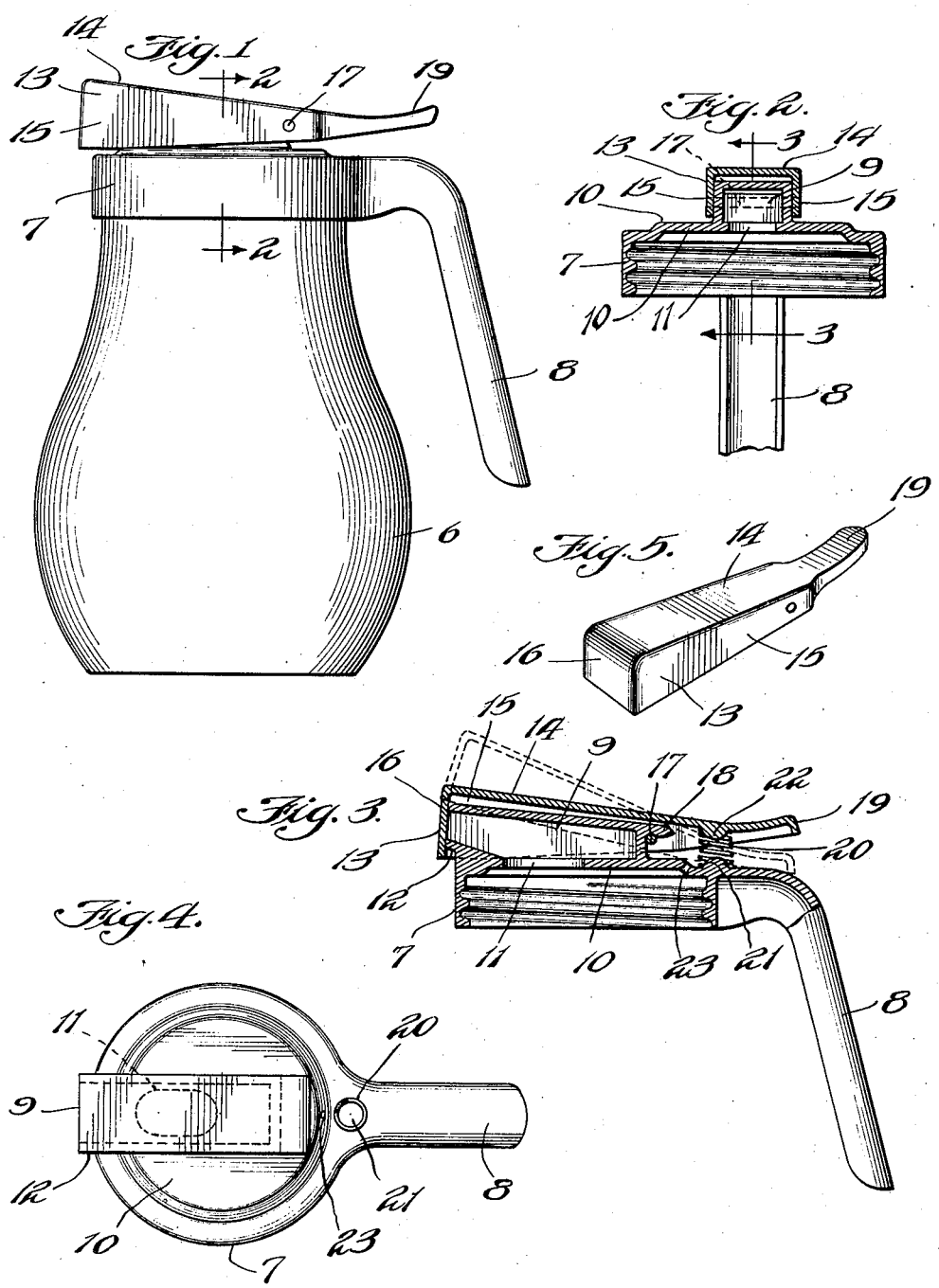

2,312,380

UNITED STATES PATENT OFFICE 2,312,380

DISPENSING CONTAINER

Rudolph Bernhardt, Chicago, Ill.

Application October 26, 1939, Serial No. 301,447

1 Claim. (Cl. 65—31)

My improved dispensing container is of the type adapted for general use but intended particularly for table use for holding and pouring various liquids such as cream, syrup, honey, and for solid or granular material such as sugar or the like.

The objects of the invention are to provide an improved container having simple and efficient closing and dispensing means to cut off or prevent any drip when the dispenser is used for liquids, particularly of a viscous nature; to provide a container top of simple construction having a pouring spout with an easily operated cover; to provide a dispensing top for a container which may be readily disassembled for cleaning; and to provide such other novel features and advantages in construction as will appear more fully from the following specification.

In the accompanying drawing illustrating a preferred form of the invention:

Figure 1 is a side view;

Figure 2 is a cross sectional view taken substantially on the line 2—2 of Figure 1;

Figure 3 is a cross sectional view taken substantially on the line 3—3 of Figure 2;

Figure 4 is a top plan view of the cap portion with the cut-off or closure member removed; and Figure 5 is a perspective view of the cut-off or closure member.

The container 6 which may be made of glass has a threaded neck for receiving a screw cap 7. This cap and other parts may be made of any suitable material but are preferably made of plastic material. The cap or cover 7 has a handle 8 which is preferably formed integrally therewith. It also has a pouring spout 9 preferably of rectangular form as shown in Figure 4 and extending upwardly from the top wall 10 of the cap. This wall has an outlet opening 11 communicating with the pouring spout. The top of the spout is preferably tapered or beveled from its inner end to the outer or pouring end as shown in Figure 3 and has an overhanging lip or pouring end 12 so that the material will be poured clear and free from the container. The pouring spout is normally closed by a cap or cover 13 of the same general configuration as the spout and having a top wall 14, side walls 15 and front end wall 16 which fits closely over the pouring outlet or lip 12 and coacts with the lip to shear off any drip from the material being poured. The cover 13 has a transverse pivot pin 17 that engages with an overhanging flange or projection 18 on the rear end of the spout and provides a hinged or pivotal connection between the cover and the spout. The cover also has a rearwardly extending thumb piece 19 which preferably projects outwardly over the inner end of the handle 8. A compression spring 20 is interposed between the top 7 and the thumb piece and tends to swing or bias the cover to closing position. Centering lugs or projections 21 and 22 on the top 7 and cover 15 respectively serve to hold the spring in operative position.

When the container is used for pouring out its contents the user grasps the handle 8 and places the thumb on the thumb piece 19 and presses it down to swing the cover to open position. During this movement it will be noted that the spring serves in the nature of a fulcrum and the pin 17 is held closely against its bearing. When the thumb is released the cover will swing with a snappy movement to closed position and cut off any drip from the nozzle. If it is desired to clean the closure, the cover 15 is raised to open position and then pushed backwardly, which causes the pin 17 to be disengaged from its bearing or projection 18 and allows the parts to be readily separated. The top 7 may also be provided with a vent 23 to facilitate the flow.

Having thus described the preferred form of my invention, what I claim is:

A dispensing top for a container comprising a cap having an outlet opening, a substantially rectangular pouring spout extending upwardly from the cap and over one side thereof with a pouring lip at the outlet end, the top of the spout being inclined from its inner end to its outer end and having a projection at its inner end with a transverse groove on its lower side to provide an open bearing, a pin detachably engaging with said groove, a closure carried by the pin and adapted to fit closely over the pouring spout, said closure having a thumb piece projecting beyond the pin, and a spring engaging with the cap and with the thumb piece for holding the closure in closed position the device being such that the closure may be readily unhooked from the projection to remove the same and the spring from the cap as for cleaning.

RUDOLPH BERNHARDT.